D. J. BROWER.
HARVESTING MACHINE.
APPLICATION FILED SEPT. 20, 1906.
977,266.
Patented Nov. 29, 1910.
3 SHEETS—SHEET 2.
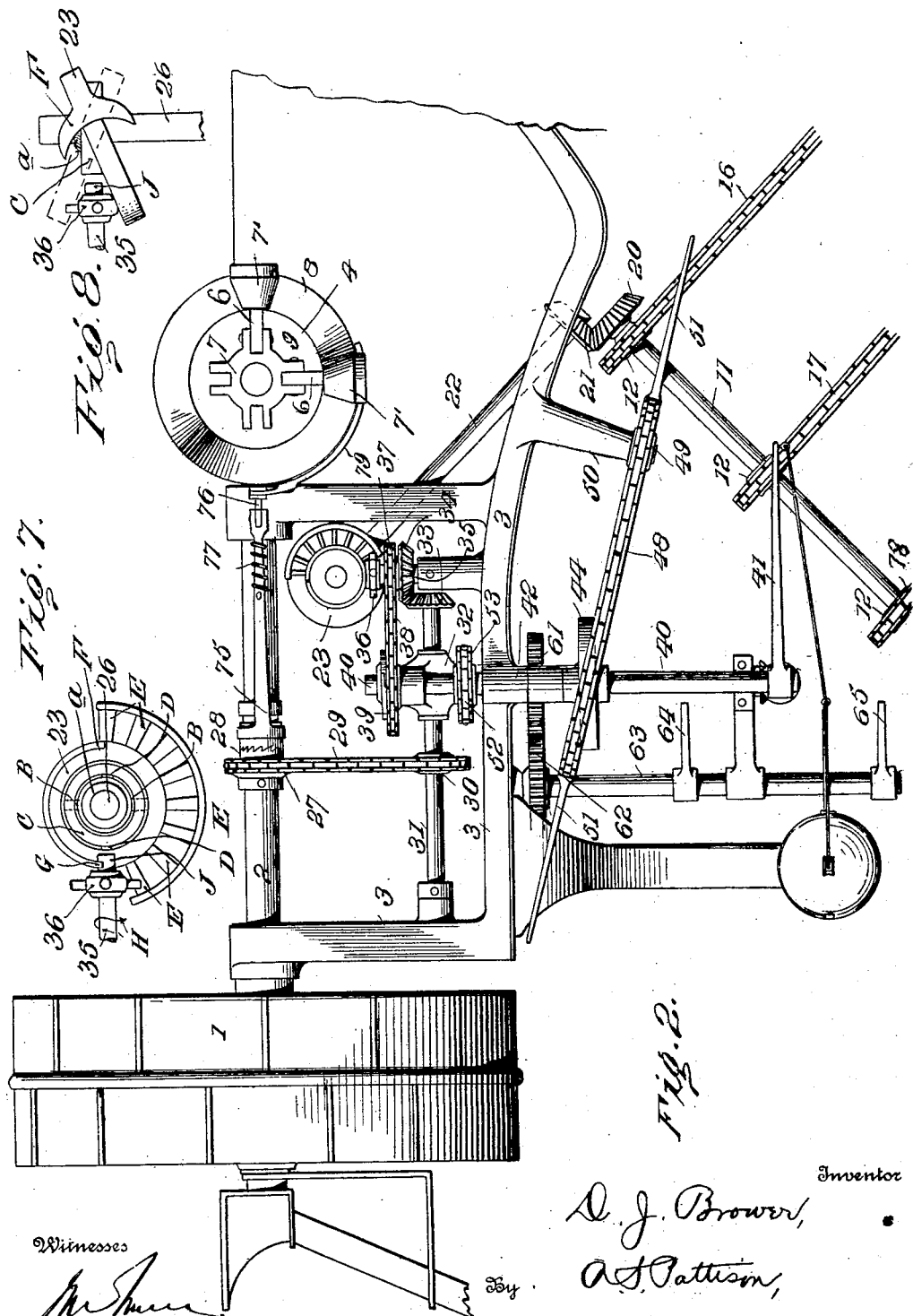

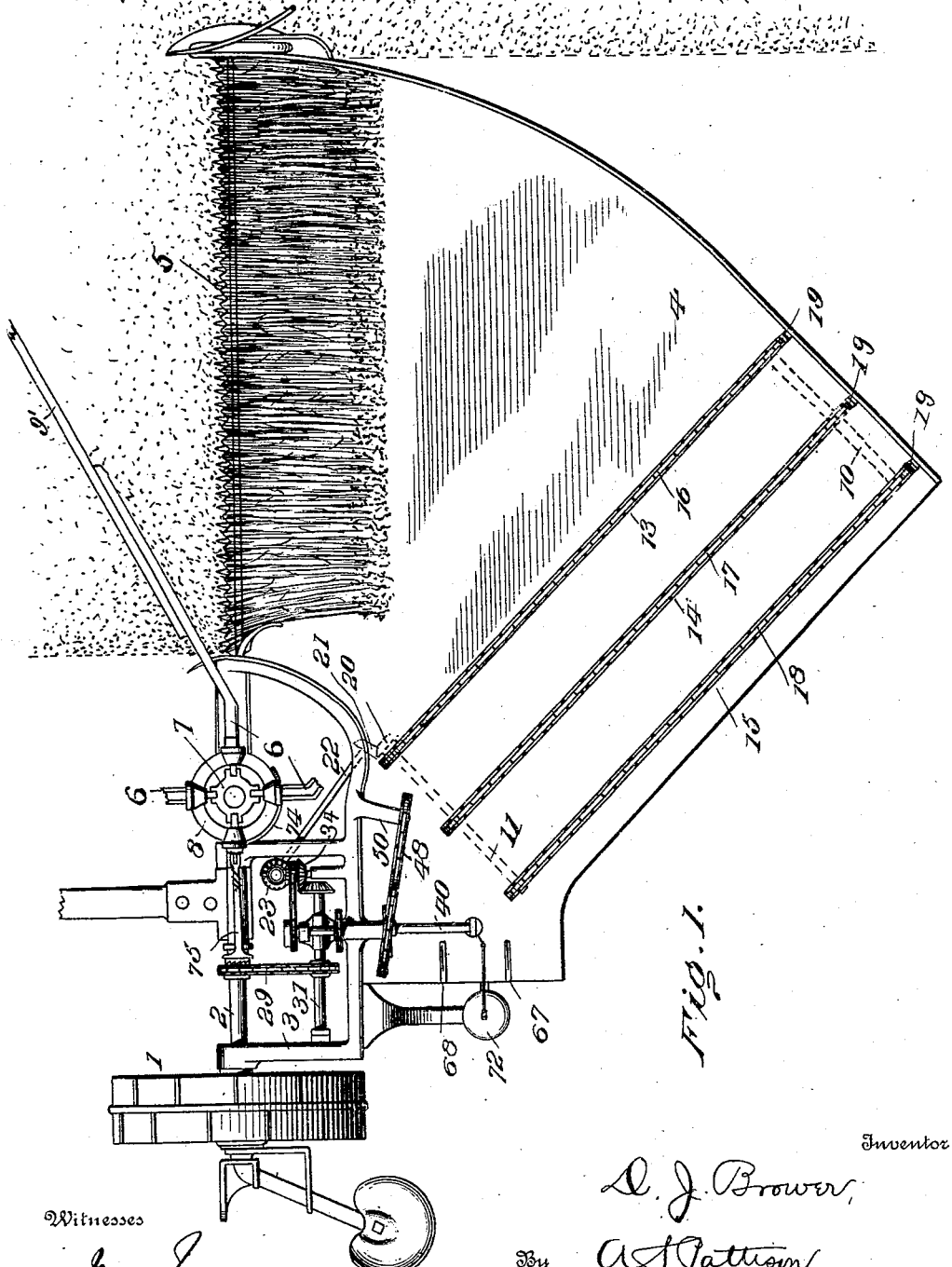

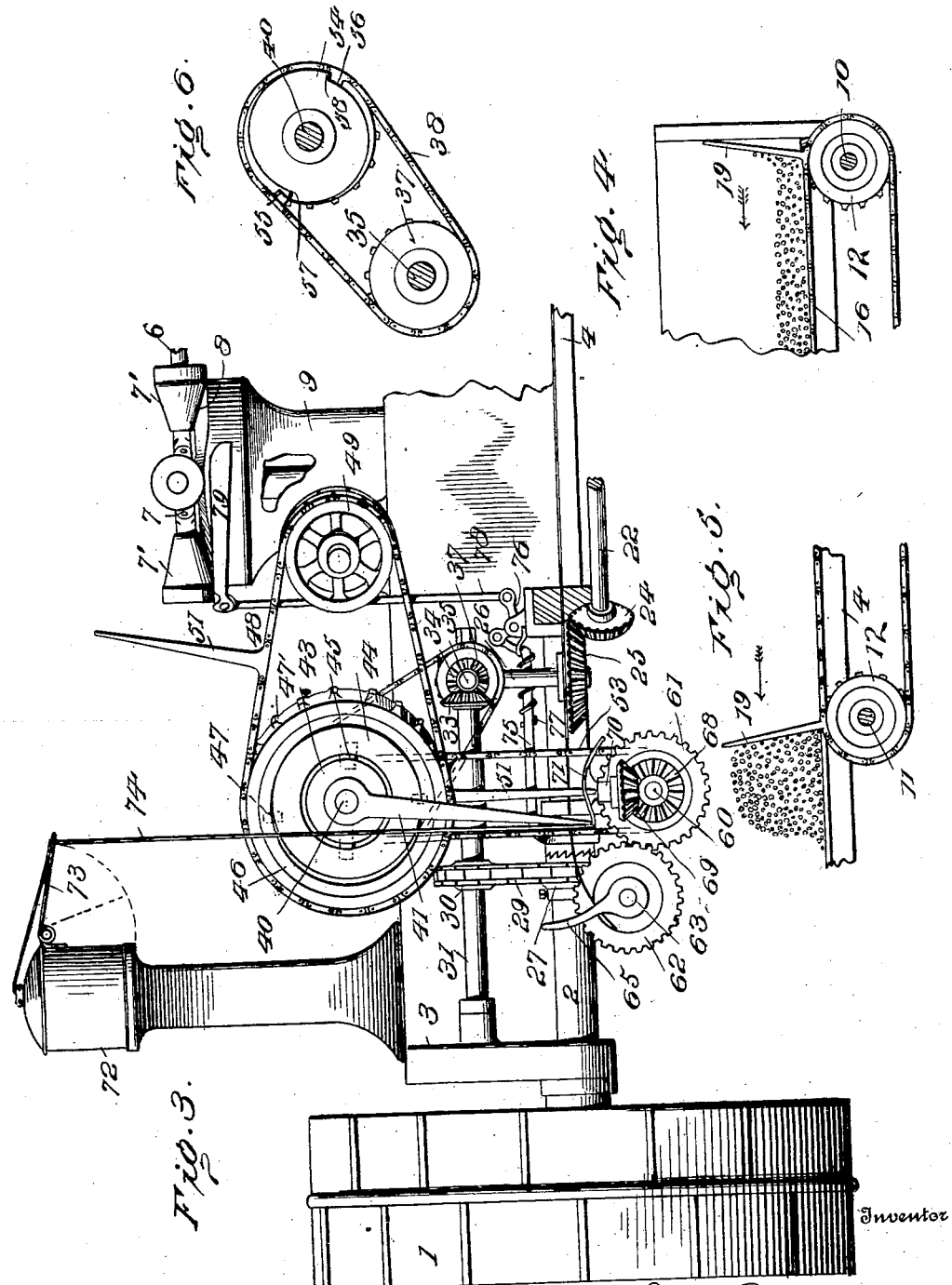

UNITED STATES PATENT OFFICE.

DOUGLASS J. BROWER, OF DULUTH, MINNESOTA.

HARVESTING-MACHINE.

977,266. Specification of Letters Patent. Patented Nov. 29, 1910.

Application filed September 20, 1906. Serial No. 335,528.

*To all whom it may concern:*

Be it known that I, DOUGLASS J. BROWER, a citizen of the United States, residing at Duluth, in the county of St. Louis and State of Minnesota, have invented certain new and useful Improvements in Harvesting-Machines, of which the following is a specification, reference being had therein to the accompanying drawing.

My invention relates to improvements in harvester machines, and pertains particularly to that class of machines of the self-binding type.

The object of my invention is to provide a machine of this character, in which the usual canvas conveyer is not used, and thus dispense with much of the complicated operative mechanism employed for operating the canvas conveyers, and at the same time provide a more efficient and direct acting harvesting machine.

Another object of my invention is to provide a more simple, cheap and effective harvester of the character hereinafter described.

In the accompanying drawings, Figure 1, is a top plan view of my improved harvester, showing the grain being cut, and with the rake arms of the reaper omitted for convenience of illustration. Fig. 2, is an enlarged top plan view partly broken away and showing the platform removed to show the binding mechanism. Fig. 3, is a rear elevation partly broken away and with the rake arms omitted as shown in Fig. 1. Fig. 4, is an enlarged vertical sectional view of the platform showing the conveying chain and arm at the outer end of the platform preparatory to conveying the grain across the platform. Fig. 5, is an enlarged vertical sectional view similar to Fig. 4, showing the arm traveling across the platform and conveying and bundling the grain. Fig. 6, is an enlarged detached side elevation of the needle operating mechanism.

Referring now to the drawings, 1 represents the bull or main wheel of the harvester, and by means of which power and motion are imparted to the machine through the medium of the shaft 2, said shaft operating the rake arms and sickle in the customary and well known way, and which forms no part of my invention. The frame 3 and platform 4 are supported upon the shaft at their inner end and the outer end of the platform is provided with supportings, as is well understood in harvesters of this character. The platform 4 is provided at its forward end with the usual cutter bar 5 which is operated in the usual manner through the medium of the shaft 2. The rake arms 6 are pivotally secured to the head 7 which is also driven in the usual manner by the shaft 2. The arms 6 are provided with cone-shaped members 7' which are loosely secured on the arms and revolve upon the beveled face 8 of the block 9, whereby the arms are supported and travel around thereon as will be hereinafter fully described. The outer ends of the arms are provided with the rakes 9' which are adapted to pass over the cutter and engage the grain as it falls upon the platform, and each rake is so timed that it engages and carries rearwardly sufficient grain to form a bundle, as will be hereinafter more fully described.

The platform 4 is supported at its outer end in the usual manner, and the rear end has mounted on its lower face the two shafts 10 and 11, each of which carries three sprocket wheels 12, although any number of sprocket wheels may be used provided they are equal on each shaft 10 and 11. I have shown three sprockets on each shaft, and the platform 4 above said sprockets is provided with slots 13, 14 and 15, which extend from one sprocket on the shaft 10 to the corresponding sprocket on shaft 11. Passing around each set of sprockets are chains 16, 17 and 18, the sprocket wheels being so mounted in respect to the platform that their upper edges are flush with the upper face of the platform, and thus the chains 16, 17 and 18 travel within the slots 13, 14 and 15 with their upper edges flush with the upper edge of the platform. The chains 16, 17 and 18 are each provided with upwardly-extending arms 19 which are adapted to engage the grain after the rake has moved it along the platform over the slots, and bundle it preparatory to binding it. The said arms 19 move back and forth across the platform, as will be hereinafter more fully described.

The shaft 11, adjacent the inner end of the platform, is provided with a bevel gear 20 which meshes with a second bevel gear 21 carried by the shaft 22. The said shaft 22 has connected thereto a suitable alternating reversible gearing 23 which is geared to the inner end of the shaft 22, whereby the direction of rotation of said shaft is reversed, which in turn reverses the direction of rotation of the shafts 10 and 11, and thus, as before stated, causes the arms 19 to travel back and forth across the platform for gathering the grain and conveying it to the inner end of the platform for binding, and said arms returning to repeat the operation. The rake and rake arms are so geared to the gearing of the shafts 22 and 11, that the arms 19 are in an outward position when the rake arms convey the grain to the rear portion of the platform, and after said rake has passed the arms travel inwardly conveying the grain. It will be seen that the arms 19 are in their outward position as each rake arm swings around, and thus the grain is bundled at the inner end of the platform preparatory to binding, each rake arm carrying sufficient grain for a bundle. The arms 19 are so geared that after having conveyed the grain across the platform, it returns before the succeeding rake has conveyed the grain to the rear of the platform.

The shaft 22 is connected to the alternating reversible gearing, as before stated, and said gearing is designated by 23. The connection between said shaft and the alternating reversible gearing is formed by providing the shaft 22 with a beveled gear 24 which meshes with a beveled gear 25 carried by the vertically-disposed shaft 26 which has its upper end connected to the alternating reversible gearing, and, as will be seen, will impart an alternating rotary motion to the shaft 22, as before stated.

The bull wheel 1 is rigidly mounted upon the shaft 2 and the said shaft carries a sprocket wheel 27 which is loosely mounted upon the shaft and locked thereto by the clutch 28. Passing over said sprocket wheel is a chain 29 which passes around a sprocket wheel 30 carried by the shaft 31. The said shaft 31 is mounted in the frame 3 and sprocket wheel 30 rigidly carried thereby. The shaft 31 passes through a bearing 32, and is provided at the end with a beveled gear 33 meshing with a bevel gear 34 mounted upon the shaft 35. The outer end of said shaft is provided with a sprocket wheel 36 which is connected to the alternating reversible gearing 23 and by means of which it is operated. The shaft 31, as shown, is always rotated in the same direction, and the alternating rotary motion to the shaft 22 is derived within the alternating reversible gearing 23.

The shaft 35 intermediate the beveled gear 34 and the sprocket 36 is provided with a sprocket wheel 37 around which a chain 38 passes, and said chain passes around a sprocket wheel 39 carried by the shaft 40 which is mounted in the journal or bearing bracket 32 at right angles to the shaft 31.

The sprocket wheel 39 is loosely mounted upon the shaft 40, and adjacent the sprocket wheel and rigidly carried by the shaft is a double cam wheel 54. On one link of the chain 38 is formed an inwardly projecting lug 55, and on another link is formed a similar lug 56, these being so spaced on the chain as to properly engage the double cam wheel 54, and which, as before stated, is securely fastened to the needle shaft. Since the length of the chain 38 is four times as great as the distance between the lugs 55 and 56, and their distance apart is just equal to one half the circumference of the sprocket wheel 39, and the engaging members 57 and 58 of the cam corresponding to the same, the sprocket wheel 39 will make just two revolutions to the needle shaft's one, as during the time of passage of the lugs about the wheel 37 there will be no engagement with the cam 54, which will allow it, with the needle shaft, to remain stationary during one half the travel of the chain. By this arrangement, it will be readily seen that time is allowed in which the alternating reversible gearing will be enabled to operate the grain conveying chains back and return with another bundle of grain when the needle is caused to act and the bundle bound.

The shaft 40 is the needle shaft and is provided on its outer end with the needle 41 which will be hereinafter more fully described. The said shaft adjacent the bearing 42 is provided with a disk 43 rigidly mounted thereon, and said disk has a ring 44 concentrically arranged around the disk, and pivoted on opposite sides in a horizontal line by the pivots 45. Concentrically arranged around said ring 44 is a second ring 46 which is pivoted vertically by pivots 47 at opposite sides, and at right angles to the pivots of the inner ring. The outer ring 46 has sprocket teeth 47' on its outer periphery, and thus forms a universal sprocket wheel which is adapted to be moved in a direction at an angle to the shaft upon which it is mounted, either horizontally or vertically, as will be clearly seen. Passing around said sprocket wheel is a chain 48 which also passes around a sprocket 49 carried by a shaft which is journaled in a stud 50 carried by the frame 3. The said chain is provided with two adjusting arms 51. The grain, as it is moved toward the binding end of the platform is at an angle to the binding mechanism, and in order to throw the outer end around parallel with the binding mechanism, I provide these adjusting arms. These arms are so arranged upon the chain and chain gearing that the arms 19 convey a bundle of grain to the rear of the platform; the adjusting arm engages it and conveys the outer end around parallel with the binding mechanism.

The needle shaft 40 adjacent the frame 3 is provided with a sprocket wheel 52 around which a chain 53 passes, and said chain passes around a sprocket wheel on the shaft 60 which is journaled on the lower face of the frame. The said shaft 60 carries a gear wheel 61 meshing with a gear wheel 62 carried by the shaft 63 which is also journaled in the frame below the platform. The shaft 63 carries two arms 64 and 65 which extend through slots 67 and 68 in the platform, and said shaft 63 is so geared with the remainder of the mechanism after the bundle has been bound, that the arms 64 and 65 engage it and discharge it from the platform.

The shaft 60 carries a beveled gear 68 which meshes with a beveled gear 69 carried by a vertical shaft 70, and said shaft 70 carries the knotter fingers 71 by means of which the binding cord is held and tied after each bundle of grain has been conveyed to the rear end of the platform and acted upon by the adjusting arm.

The frame 3, adjacent the bull wheel, is provided with a receptacle 72 in which the binding cord is held, and said receptacle is provided with an outwardly extending spring arm 73 having an opening at its outer end, through which the binding cord 74 passes, and by means of which the proper tension is kept upon the binding cord. The binding cord passes downwardly from the spring arm through the looper arm and thence to the knotter fingers and is held by the same.

As before described, the entire working mechanism of the harvester, outside of the rake arms and the cutter bar, is operated by the chain 29, and in order to stop the operating mechanism for the conveying, binding and tying mechanism for a sufficient time to allow of the proper amount of grain being cut and carried rearwardly over the platform before the conveying, binding and tying mechanism is started. I provide the sprocket 27 loosely mounted upon the shaft 2 and locked upon the shaft by the clutch 28. This clutch is of sliding form, and has a bifurcated lever 75 straddling the clutch, and said lever has its opposite end pivoted to a bell crank lever 76. Surrounding the lever 75 and secured thereto and to the frame of the harvester, is a coil spring 77 which normally holds the clutch out of engagement with the sprocket wheel 27, and the mechanism is normally not in operative connection with the main drive shaft of the machine. Connected to the bell crank lever 76 is a rod 78 which extends upwardly and is pivotally connected to an intermediately pivoted lever 79 which is pivoted to the reaper arm supporting head 8. The said head, as before stated, is of a circular form, and the intermediately pivoted lever is of a form to correspond therewith, and by reason of the coil spring, the said lever is normally held above the beveled bearing surface of the head, and as the rake arm is swung around, the portion 7' engages and depresses the lever, and through the bell crank lever and the other levers, the clutch 28 is thrown in engagement with the sprocket wheel, and when this has been accomplished, the rake has carried sufficient grain across the platform to the conveyer. The conveyer, binding, tying and discharging mechanism is started, and thus after each rake arm depresses the lever, the mechanism is started, and a bundle is bound and discharged from the machine.

The mode of operation is as follows: The machine is started, the cutter bar operating in the usual manner, and the rake arm revolves carrying the cut grain from the front end of the platform around to the rear end above the chains. When the rake arm has reached such a position, it has depressed the lever, coupling the binding mechanism with the main drive shaft by means of the clutch, as heretofore fully described. By the time the rake arm has carried the grain across the platform, the arms 19 start to travel across the same, carrying the grain and gathering it into an even bundle with the heads all at one end. After the grain has been thus carried across the platform, it lies at an angle to the binding mechanism, and in such a position the arm 51 engages one end or the butt end, and throws this end around so that it is parallel with the binding mechanism. While in this position the binding arm revolves carrying the cord or binding material around the bundle, and the knotter 71 ties the cord and severs it. When this operation has been accomplished, the discharging arms are moving upwardly and engage and discharge the bundle of grain from the platform.

Fixed to the shaft 26 is the hub piece A having radial pivots B engaging and supporting the intermediate ring C which also has radially disposed pivots D engaging and supporting the member 23 which latter carries the radial spokes or teeth E for engagement with the sprocket 36 and also carries the forked members F and G. The member 23 is thus mounted to provide it with universal movement which will allow it to oscillate about the sprocket 36 as indicated by dotted lines Fig. 8. Thus as the sprocket 36 revolves in the direction indicated by the arrow H, it will turn the member 23 until the last spoke therein is engaged at which time the fork F will contact the inner projecting end J of the shaft 35 and retard further revolution of the member 23, but as the sprocket 36 still revolves in the same direction it will simply raise the last contacting spoke and carry it up over the sprocket 36 which tilts the member 23 and returns it to its original position by the continued action of the sprocket 36, then when the last spoke on the opposite side of the member 23 is reached the opposite fork G will engage the shaft end J and the member 23 tipped down as shown in Fig. 7 of the drawings, thus imparting an alternating reverse motion to the shaft 26 as required by the conveyer chains.

Having thus described my invention, what I claim, and desire to secure by Letters Patent, is:—

1. The combination with the platform of a harvesting machine having a cutter bar at its forward edge, rakes carrying the grain from the cutter bar to the rear of the platform, a binder on the platform, endless chains at an angle to the cradle of the binder for gathering and conveying the grain to a position adjacent the binder, an arm for engaging the butt end of the grain and moving it around into a position adjacent the binding mechanism.

2. The combination with a platform of a harvesting machine having a cutter bar at its forward edge, rakes carrying the grain to the rear of the platform, a binder mechanism on the platform, endless chains at an angle to the cradle of the binder and having a reciprocating motion for gathering and conveying and stacking the grain adjacent the binder, an arm for engaging the butt end of the grain and moving it around into a position adjacent the binding mechanism, means for operating said binding mechanism, and means for discharging said bundles from the platform.

3. A harvester, comprising a main drive wheel, a platform supported thereby, a cutter-bar carried by the platform, rakes carried by the platform, an endless conveyer in rear of the cutter-bar, a binding and tying mechanism adjacent the endless conveyer with its grain cradle at an angle to the delivery end of the conveyer, means for engaging one end of the grain and moving it around to binding position, and means operated by the drive wheel for operating the rakes, cutter-bar, conveyer, binder and grain-moving means in proper unison with one another.

4. A harvester, comprising a supporting wheel, a shaft carried thereby, a platform supported by the shaft, a cutter bar and rakes carried by the platform and driven by the shaft, means carried by the platform for conveying and binding the grain as it is delivered from the rakes, means operated by the shaft for operating the conveying mechanism and binding mechanism, and means operated by the rakes for coupling the conveying and binding mechanism to the wheel shaft for a predetermined length of time.

5. A harvester, comprising a supporting wheel, a shaft carried thereby, a platform supported by the shaft, a cutter bar and rakes carried by the platform and driven by the shaft, a conveying and binding mechanism carried by the rear of the platform for conveying and binding the grain as it is delivered by the rakes, a discharging mechanism carried by the platform in rear of the binding mechanism, means operated by the shaft for driving said conveying, binding and discharging mechanism, and means operated by the rakes for coupling the conveying and binding and discharging mechanism to the wheel shaft for a predetermined length of time.

6. A harvester, comprising a drive wheel, a shaft carried thereby, a platform supported by the shaft, a cutter bar and rakes carried by the forward end of the platform and driven by the wheel shaft, a conveying mechanism carried by the platform at an angle to the wheel shaft less than a right angle, a binding mechanism carried by the platform with its cradle at right angles to the wheel shaft, traveling arms carried by the platform for engaging the headed end of the grain as it passes from the conveyer and forcing it around parallel with the cradle of the binding mechanism, and means driven by the wheel shaft for operating said conveying, straightening, and binding mechanism.

7. A harvester, comprising a drive wheel, a shaft carried thereby, a platform supported by the shaft, a cutter bar and rakes carried by the forward end of the platform, and driven by the shaft, a conveyer carried by the platform at an angle to the cutter bar less than a right angle, an alternating reversible gearing driven by the wheel shaft and adapted to move the conveyer back and forth across the platform, a binding mechanism adjacent the inner end of the conveyer and arranged with its cradle at right angles to the cutter bar, an endless chain arranged at the inner end of the conveyer and having arms adapted to engage the butt ends of the grain and move it around parallel with the cradle of the binding mechanism, discharging arms carried by the platform at one side of the binding mechanism and adapted to discharge the bundles after having been bound, and a series of gearings so arranged and constructed as to operate the conveying, straightening, binding and discharging mechanism at the specified time in respect to each other, means carried by the wheel shaft for operating said series of gearings, and means operated by the rakes for coupling said means to the wheel shaft, whereby the conveying, binding, straightening and discharging mechanisms are stopped for a period of time to allow sufficient grain to be cut to form a bundle.

8. A harvester comprising a drive wheel, a shaft carried thereby, a platform supported by the shaft, a cutter-bar and rakes carried by the forward end of the platform, and driven by the shaft, a conveyer carried by the platform at an angle to the cutter-bar, less than a right angle, an alternating reversible gearing driven by the wheel shaft moving the conveyer back and forth across the platform, a binding mechanism adjacent the inner end of the conveyer and arranged so that the grain cradle thereof is at right angles to the cutter bar, an endless chain arranged at the inner end of the conveyer and having arms adapted to engage the headed end of the grain and move it around parallel with the cradle of the binding mechanism, discharging arms carried by the platform at one side of the binding mechanism and adapted to discharge the bundles after having been bound, and a series of gearing so arranged and constructed as to operate the conveying, straightening, binding and discharging mechanism at the specified time, in respect to each other, means carried by the wheel shaft for operating said series of gearings, and means operated by the rakes for coupling said means to the wheel shaft, whereby the conveying, binding and straightening and discharging mechanism is stopped for a period of time to allow sufficient grain to be cut to form a bundle.

9. A harvester, comprising a drive wheel, a shaft supported by the wheel, a platform supported by the shaft, a cutter bar and rakes carried by the forward end of the platform, and driven by the shaft, a conveyer mechanism carried by the platform at an angle to the wheel shaft, a binding mechanism carried by the platform, an alternating reversible gearing driven by the wheel shaft and connecting the conveying and binding mechanism whereby they are intermittently driven, and an arm above and at the inner end of the conveyer for moving the grain around into a binding position.

In testimony whereof I affix my signature in presence of two witnesses.

DOUGLASS J. BROWER.

Witnesses:
 Geo. S. Muir,
 W. I. Forbes.